United States Patent
Drancea et al.

(10) Patent No.: US 11,661,206 B2
(45) Date of Patent: May 30, 2023

(54) METHOD, SYSTEM, AND GRAPHICAL INDICATOR FOR PROVIDING A LATERAL CENTER OF GRAVITY OF AN AIRCRAFT

(71) Applicant: BOMBARDIER INC., Dorval (CA)

(72) Inventors: Andrei Drancea, Toronto (CA); George Shpati, Montreal (CA)

(73) Assignee: BOMBARDIER INC., Dorval (CA)

( * ) Notice: Subject to any disclaimer, the term of this patent is extended or adjusted under 35 U.S.C. 154(b) by 343 days.

(21) Appl. No.: 16/648,825

(22) PCT Filed: Sep. 28, 2018

(86) PCT No.: PCT/CA2018/051225
§ 371 (c)(1),
(2) Date: Mar. 19, 2020

(87) PCT Pub. No.: WO2019/061000
PCT Pub. Date: Apr. 4, 2019

(65) Prior Publication Data
US 2020/0216188 A1    Jul. 9, 2020

Related U.S. Application Data

(60) Provisional application No. 62/565,235, filed on Sep. 29, 2017.

(51) Int. Cl.
*B64D 43/00* (2006.01)
*B64D 45/00* (2006.01)
(Continued)

(52) U.S. Cl.
CPC ............. *B64D 43/00* (2013.01); *B64D 45/00* (2013.01); *B64C 17/10* (2013.01); *G01M 1/127* (2013.01); *G01M 1/365* (2013.01); *G05D 1/0858* (2013.01)

(58) Field of Classification Search
CPC ...... G05D 1/0858; B64D 43/00; B64D 45/00; G01M 1/127; G01M 1/365; B64C 17/10
(Continued)

(56) References Cited

U.S. PATENT DOCUMENTS 2,453,607 A    11/1948  Wardle et al.
4,545,019 A    10/1985  Glover
(Continued)

FOREIGN PATENT DOCUMENTS

CA    2830709 A1  *  5/2014  ............. B64D 37/06
CA    2843736 A1  *  9/2014  ............. B64D 31/00
(Continued)

OTHER PUBLICATIONS

Ying, et al.; Design of a Center of Gravity Control Law with Unbalanced Fuel in Aircraft Wing Tanks; Jan. 26, 2021; 2020 7th International Conference on Dependable Systems and Their Applications (DSA); pp. 202-204 (https://ieeexplore.ieee.org/document/9331066) (Year: 2021).*

(Continued)

*Primary Examiner* — Atul Trivedi
(74) *Attorney, Agent, or Firm* — Norton Rose Fulbright Canada LLP

(57) ABSTRACT

The present disclosure provides methods and systems for providing a lateral center of gravity of an aircraft on an aircraft display. A fuel distribution in the aircraft fuel tanks is determined. A lateral center of gravity of the aircraft is determined based on the fuel distribution. The lateral center of gravity is sent to the aircraft display. The present disclosure further provides an aircraft display for displaying the lateral center of gravity of an aircraft.

14 Claims, 16 Drawing Sheets

(51) Int. Cl.
*B64C 17/10* (2006.01)
*G01M 1/12* (2006.01)
*G01M 1/36* (2006.01)
*G05D 1/08* (2006.01)

(58) Field of Classification Search
USPC .................................................. 701/3
See application file for complete search history.

(56) References Cited

U.S. PATENT DOCUMENTS

| | | | |
|---|---|---|---|
| 4,622,639 A * | 11/1986 | Adelson | G01M 1/127 |
| | | | 73/65.06 |
| 4,918,619 A | 4/1990 | Orloff | |
| 6,899,300 B2 | 5/2005 | Haghayeghi | |
| 6,913,228 B2 | 7/2005 | Lee et al. | |
| 7,954,766 B2 | 6/2011 | Brainard et al. | |
| 8,226,040 B2 | 7/2012 | Neto | |
| 8,231,082 B2 | 7/2012 | Delporte et al. | |
| 8,548,721 B2 | 10/2013 | Paillard et al. | |
| 9,205,930 B2 | 12/2015 | Yanagawa | |
| 9,361,486 B2 | 6/2016 | McDonough et al. | |
| 9,464,958 B2 | 10/2016 | Shue | |
| 2005/0051666 A1* | 3/2005 | Lee | B64C 17/10 |
| | | | 244/10 |
| 2009/0114773 A1 | 5/2009 | Helou, Jr. | |
| 2010/0044515 A1* | 2/2010 | Neto | G01M 1/127 |
| | | | 244/135 C |
| 2010/0063718 A1 | 3/2010 | Schmidt | |
| 2011/0226906 A1* | 9/2011 | Spottiswoode | G01M 1/127 |
| | | | 244/135 C |
| 2012/0150517 A1* | 6/2012 | Ray | G06F 30/00 |
| | | | 703/1 |
| 2015/0094982 A1* | 4/2015 | Dupont De Dinechin | |
| | | | G01G 19/414 |
| | | | 702/175 |
| 2015/0100227 A1 | 4/2015 | Nance | |
| 2015/0316438 A1 | 11/2015 | Nance | |
| 2016/0152318 A1* | 6/2016 | Alexander | B64D 27/18 |
| | | | 244/13 |
| 2016/0195447 A1* | 7/2016 | Nance | G01G 19/07 |
| | | | 701/124 |
| 2016/0209290 A1* | 7/2016 | Shue | B64C 29/0033 |
| 2016/0375985 A1* | 12/2016 | Ribarov | B64D 37/04 |
| | | | 244/135 C |
| 2017/0045409 A1* | 2/2017 | Cousins | G01M 1/125 |
| 2017/0315014 A1* | 11/2017 | Regan | B64D 45/00 |
| 2021/0292009 A1* | 9/2021 | Mangat | B64D 45/00 |

FOREIGN PATENT DOCUMENTS

| | | | | |
|---|---|---|---|---|
| CA | 2934201 A1 * | 12/2016 | | B64C 17/10 |
| CA | 2948754 A1 * | 8/2017 | | G01F 23/292 |
| CN | 102110177 A * | 6/2011 | | |
| EP | 1904564 B1 * | 9/2011 | | B64D 1/22 |
| EP | 3098579 A1 * | 11/2016 | | G01G 19/07 |
| EP | 3412562 A1 * | 12/2018 | | B64C 17/10 |
| EP | 2772732 B1 * | 2/2020 | | B64D 31/00 |
| FR | 2988835 A1 * | 10/2013 | | B64D 43/02 |
| FR | 2988836 A1 * | 10/2013 | | G01G 19/07 |
| GB | 2190501 A | 11/1987 | | |
| RU | 2400405 C1 * | 9/2010 | | |
| RU | 2009127864 A * | 1/2011 | | |
| RU | 2435705 C2 * | 12/2011 | | |
| WO | WO-2010022484 A1 * | 3/2010 | | B64C 17/10 |
| WO | WO-2010058147 A1 * | 5/2010 | | B64C 17/10 |
| WO | WO-2010061156 A1 * | 6/2010 | | B64C 17/10 |
| WO | WO-2015054449 A1 * | 4/2015 | | B64D 45/00 |
| WO | WO-2015196259 A1 * | 12/2015 | | G06Q 10/047 |
| WO | WO-2017079848 A1 * | 5/2017 | | B64F 5/40 |

OTHER PUBLICATIONS

Miao, et al.; Modeling of center of gravity of aircrafton multifaults for fuel transfer; Oct. 23, 2014; 2014 9th IEEE Conference on Industrial Electronics and Applications; pp. 1691-1695 (https://ieeexplore.ieee.org/document/6931440) (Year: 2014).*
"The perils of forward CG : loading your airplane with a forward center of gravity wing loading, lift and induced drag", ProQuest Dialog, Aviation Safety 36.2 (Feb. 2016): 12.
International Search Report and Written Opinion dated Dec. 17, 2018 in connection with international patent application No. PCT/CA2018/051225.
Burcham, F.W. et al., "Emergency Flight Control Using Only Engine Thrust and Lateral Center-of-Gravity Offset: A First Look", NASA Technical Memorandum 4798, Jul. 1997, 20 pages.
Ohanian, O.J.III, "Mass Properties Calculation and Fuel Analysis in the Conceptual Design of Uninhabited Air Vehicles", Thesis Submitted to the Faculty of Virginia Polytechnic Institute and State University, Dec. 2003, 114 pages.

* cited by examiner

METHOD, SYSTEM, AND GRAPHICAL INDICATOR FOR PROVIDING A LATERAL CENTER OF GRAVITY OF AN AIRCRAFT

CROSS-REFERENCE TO RELATED APPLICATIONS

The present application claims priority to U.S. Provisional Patent Application bearing Ser. No. 62/565,235 filed on Sep. 29, 2017, the contents of which are hereby incorporated by reference.

TECHNICAL FIELD

The present disclosure relates generally to aircraft instrumentation, and more specifically to a lateral center of gravity display and systems and methods for providing the lateral center of gravity of an aircraft on an aircraft display.

BACKGROUND OF THE ART

The location of the center of gravity of an aircraft can affect its stability. If the positioning of the center of gravity exceeds a certain threshold set by the aircraft manufacturer, the aircraft performance may be impacted.

The center of gravity of the aircraft may be specified in the longitudinal, lateral and vertical directions. The longitudinal center of gravity refers to the balance of the aircraft along the longitudinal or lengthwise axis (known as the pitch direction or forward and aft direction). The lateral center of gravity refers to the balance of the aircraft in the lateral direction (known as right to left direction). The vertical center of gravity refers to the positioning of the center of gravity of the aircraft in the vertical direction (known as the up and down direction). Aircraft manufacturers may set longitudinal, lateral and vertical center of gravity limits.

An imbalance in the lateral center of gravity has historically been considered less critical than an imbalance in the longitudinal center of gravity, as most of the mass of the aircraft is located close to its center. However, the lateral center of gravity of the aircraft can be affected by fuel stored in fuel tanks located inside the wings not being evenly distributed between both sides of the aircraft. Existing alerting systems of aircraft do not readily facilitate such lateral center of gravity imbalance to be remedied.

SUMMARY

The present disclosure provides methods and system for providing a lateral center of gravity of an aircraft on an aircraft display. A fuel distribution in the aircraft fuel tanks is determined. A lateral center of gravity of the aircraft is determined based on the fuel distribution. The lateral center of gravity is sent to the aircraft display. The present disclosure further provides a graphical indicator for an aircraft display for displaying the lateral center of gravity of an aircraft.

In accordance with a broad aspect, there is provided a method for providing a lateral center of gravity of an aircraft on an aircraft display. The method comprises determining a fuel distribution in fuel tanks of a first wing and a second wing of the aircraft, determining a lateral center of gravity of the aircraft based at least in part on the fuel distribution, and sending a signal indicative of the lateral center of gravity to the aircraft display.

In some embodiments, the first wing comprises a first tank that is an inboard tank and a second tank that is an outboard tank, and the second wing comprises a third tank that is an inboard tank and a fourth tank that is an outboard tank.

In some embodiments, determining the fuel distribution comprises determining a first mass of fuel in the first tank from fuel density and fuel volume measurements in the first tank, determining a second mass of fuel in the second tank from fuel density and fuel volume measurements in the second tank, determining a third mass of fuel in the third tank from fuel density and fuel volume measurements in the third tank, determining a fourth mass of fuel in the fourth tank from fuel density and fuel volume measurements in the fourth tank, and determining the fuel distribution based on the first mass of fuel, the second mass of fuel, the third mass of fuel, the fourth mass of fuel and a configuration of the first tank, the second tank, the third tank and the fourth tank.

In some embodiments, determining the lateral center of gravity of the aircraft comprises determining a first moment arm based on the first mass of fuel and a first distance between a first tank center of mass and a substantially centered longitudinal axis of the aircraft, determining a second moment arm based on the second mass of fuel and a second distance between a second tank center of mass and the substantially centered longitudinal axis of the aircraft, determining a third moment arm based on the third mass of fuel and a third distance between a third tank center of mass and the substantially centered longitudinal axis of the aircraft, determining a fourth moment arm based on the fourth mass of fuel and a fourth distance between a fourth tank center of mass and the substantially centered longitudinal axis of the aircraft, and determining the lateral center of gravity using the first moment arm, the second moment arm, the third moment arm and the fourth moment arm.

In some embodiments, the method further comprises displaying the lateral center of gravity on the display with respect to at least one threshold.

In some embodiments, the method further comprises displacing a pointer indicative of the lateral center of gravity on the display with respect to the at least one threshold when the lateral center of gravity of the aircraft changes.

In some embodiments, the at least one threshold comprises at least one on ground threshold for use when the aircraft is on ground and at least one inflight threshold for use when the aircraft is in flight.

In some embodiments, the method further comprises determining the at least one threshold as a function of a total fuel mass.

In some embodiments, the method further comprises triggering a rebalancing of fuel between at least some of the first tank, the second tank, the third tank, and the fourth tank when the lateral center of gravity exceeds a first one of the at least one threshold.

In some embodiments, the method further comprises triggering an alert when the lateral center of gravity exceeds a second one of the at least one threshold.

According to another broad aspect, there is provided a system for providing a lateral center of gravity of an aircraft on an aircraft display. The system comprises a processing unit and a non-transitory computer-readable memory having stored thereon program instructions. The program instructions are executable by the processing unit for determining a fuel distribution in fuel tanks of a first wing and a second wing of the aircraft, determining a lateral center of gravity of the aircraft based at least in part on the fuel distribution, and sending a signal indicative of the lateral center of gravity to the aircraft display.

In some embodiments, the first wing comprises a first tank that is an inboard tank and a second tank that is an outboard tank, and the second wing comprises a third tank that is an inboard tank and a fourth tank that is an outboard tank.

In some embodiments, determining the fuel distribution comprises determining a first mass of fuel in the first tank from fuel density and fuel volume measurements in the first tank, determining a second mass of fuel in the second tank from fuel density and fuel volume measurements in the second tank, determining a third mass of fuel in the third tank from fuel density and fuel volume measurements in the third tank, determining a fourth mass of fuel in the fourth tank from fuel density and fuel volume measurements in the fourth tank, and determining the fuel distribution based on the first mass of fuel, the second mass of fuel, the third mass of fuel, the fourth mass of fuel and a configuration of the first tank, the second tank, the third tank and the fourth tank.

In some embodiments, determining the lateral center of gravity of the aircraft comprises determining a first moment arm based on the first mass of fuel and a first distance between a first tank center of mass and a substantially centered longitudinal axis of the aircraft, determining a second moment arm based on the second mass of fuel and a second distance between a second tank center of mass and the substantially centered longitudinal axis of the aircraft, determining a third moment arm based on the third mass of fuel and a third distance between a third tank center of mass and the substantially centered longitudinal axis of the aircraft, determining a fourth moment arm based on the fourth mass of fuel and a fourth distance between a fourth tank center of mass and the substantially centered longitudinal axis of the aircraft, and determining the lateral center of gravity using the first moment arm, the second moment arm, the third moment arm and the fourth moment arm.

In some embodiments, the program instructions are further executable by the processing unit for displaying the lateral center of gravity on the display with respect to at least one threshold.

In some embodiments, the program instructions are further executable by the processing unit for displacing a pointer indicative of the lateral center of gravity on the display with respect to the at least one threshold when the lateral center of gravity of the aircraft changes.

In some embodiments, the at least one threshold comprises at least one on ground threshold for use when the aircraft is on ground and at least one inflight threshold for use when the aircraft is in flight.

In some embodiments, the program instructions are further executable by the processing unit for determining the at least one threshold as a function of a total fuel mass.

In some embodiments, the program instructions are further executable by the processing unit for triggering a rebalancing of fuel between at least some of the first tank, the second tank, the third tank, and the fourth tank when the lateral center of gravity exceeds a first one of the at least one threshold.

In some embodiments, the program instructions are further executable by the processing unit for triggering an alert when the lateral center of gravity exceeds a second one of the at least one threshold.

According to another broad aspect, there is provided a graphical indicator for an aircraft display. The graphical indicator comprises a first segment extending from a first end to a second end, a central marker substantially centered between the first end and the second end of the first segment to represent a balanced lateral center of gravity, and a pointer displaceable along the first segment between the first end and the second end, a position of the pointer along the first segment being indicative of one of a balanced lateral center of gravity, a left wing imbalance, and a right wing imbalance as a function of a relative position of the pointer with the central marker.

In some embodiments, the graphical indicator further comprises a first pair of threshold markers positioned along the first segment, wherein each threshold marker of the first pair of threshold markers is spaced equidistantly from the center marker towards a respective one of the first end and the second end.

In some embodiments, the graphical indicator further comprises a second pair of threshold markers positioned along the first segment, wherein each threshold marker of the second pair of threshold markers is spaced equidistantly from a respective threshold marker of the first pair of threshold markers towards a respective one of the first end and the second end.

In some embodiments, the graphical indicator further comprises a second segment extending from a third end to a fourth end, wherein the first segment is for use when the aircraft is in flight and the second segment is for use when the aircraft is on ground.

In some embodiments, the first segment and the second segment are positioned one above the other, and wherein the pointer is positioned between the first segment and the second segment.

In some embodiments, the central marker is substantially centered between the third end and the fourth end of the second segment.

In some embodiments, a visual element of the graphical indicator indicates usage of one of the first segment and the second segment as a function of an aircraft status.

In some embodiments, the graphical indicator further comprises a third pair of threshold markers positioned along the second segment, wherein each threshold marker of the third pair of threshold markers is spaced equidistantly from the center marker towards a respective one of the third end and the fourth end.

In some embodiments, the graphical indicator further comprises a fourth pair of threshold markers positioned along the second segment, wherein each threshold marker of the fourth pair of threshold markers is spaced equidistantly from a respective threshold marker of the first third of threshold markers towards a respective one of the third end and the fourth end.

In some embodiments, the first segment and the second segment display the lateral center of gravity of the aircraft using a same scale.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Methods and systems for providing a lateral center of gravity of an aircraft on an aircraft display are described herein. The lateral center of gravity is determined based on distribution of fuel in the fuel tanks of the aircraft. The present disclosure further provides a graphical indicator for displaying the lateral center of gravity of an aircraft.

Figure 1A:
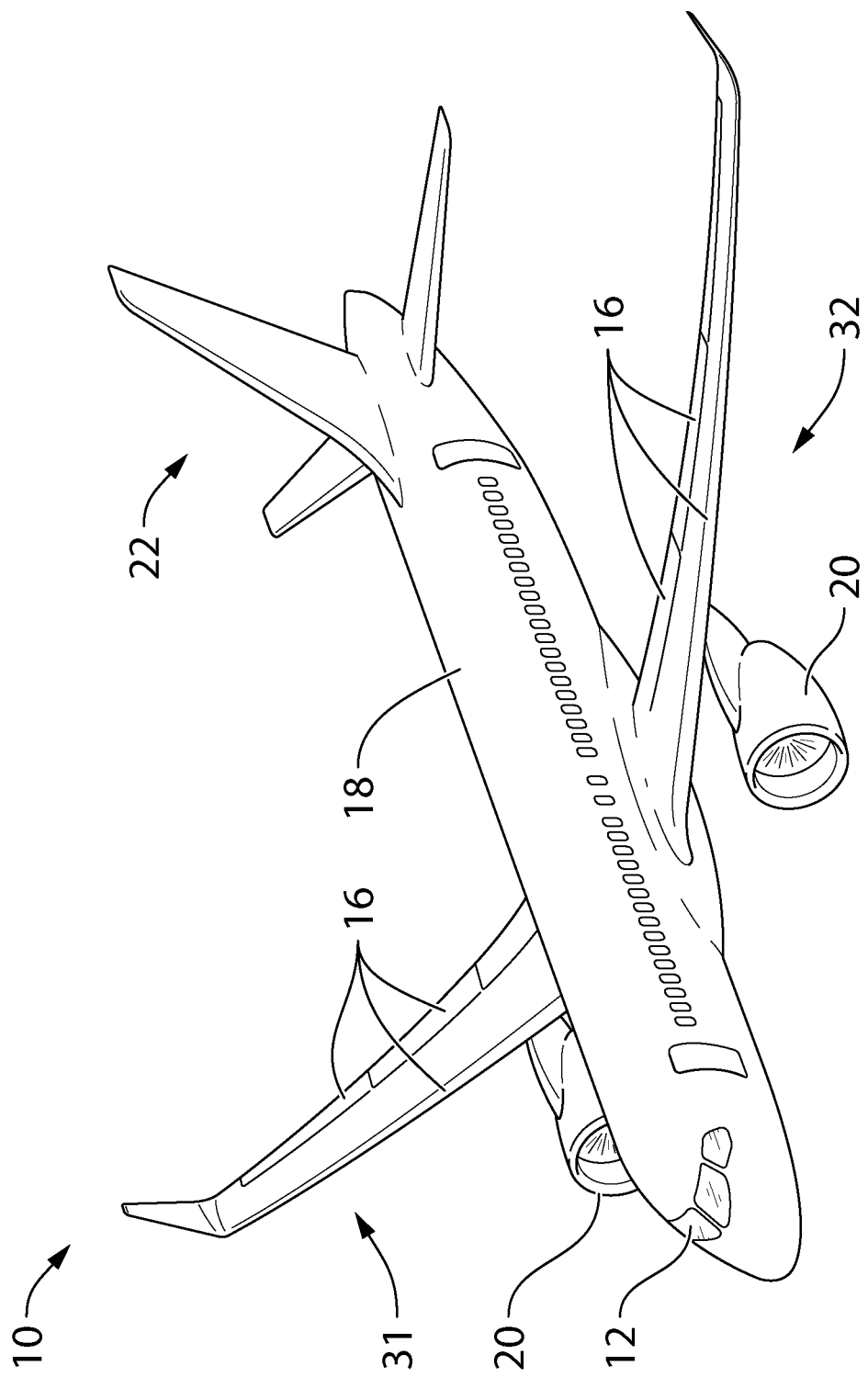
FIG. 1A is a diagram of an example aircraft.

With reference to FIG. 1A, an exemplary aircraft 10 is shown. The aircraft 10 may be any type of aircraft such as a propeller plane, jet plane, turbojet plane, turbo-propeller plane, and the like. For example, the aircraft 10 may be a narrow-body, twin-engine jet airliner. The aircraft 10 may be a fixed-wing aircraft. The aircraft 10 may comprise flight control components 16, wings 31, 32, fuselage 18, engines 20 and empennage 22 of known or other type. In the embodiment illustrated, a single engine 20 is mounted under each of the wings 31, 32. However, two or more engines 20 may be mounted to one or more of wings 31, 32. Alternatively, or in addition, one or more engines 20 may be mounted to fuselage 18 or be installed on the aircraft 10 in any suitable manner. A cockpit 12 may be positioned at any suitable location on the aircraft 10, for example at a front portion of the fuselage 18. The cockpit 12 is configured for accommodating one or more pilots who control the operation of the aircraft 10 by way of one or more operator controls.

Figure 1B:
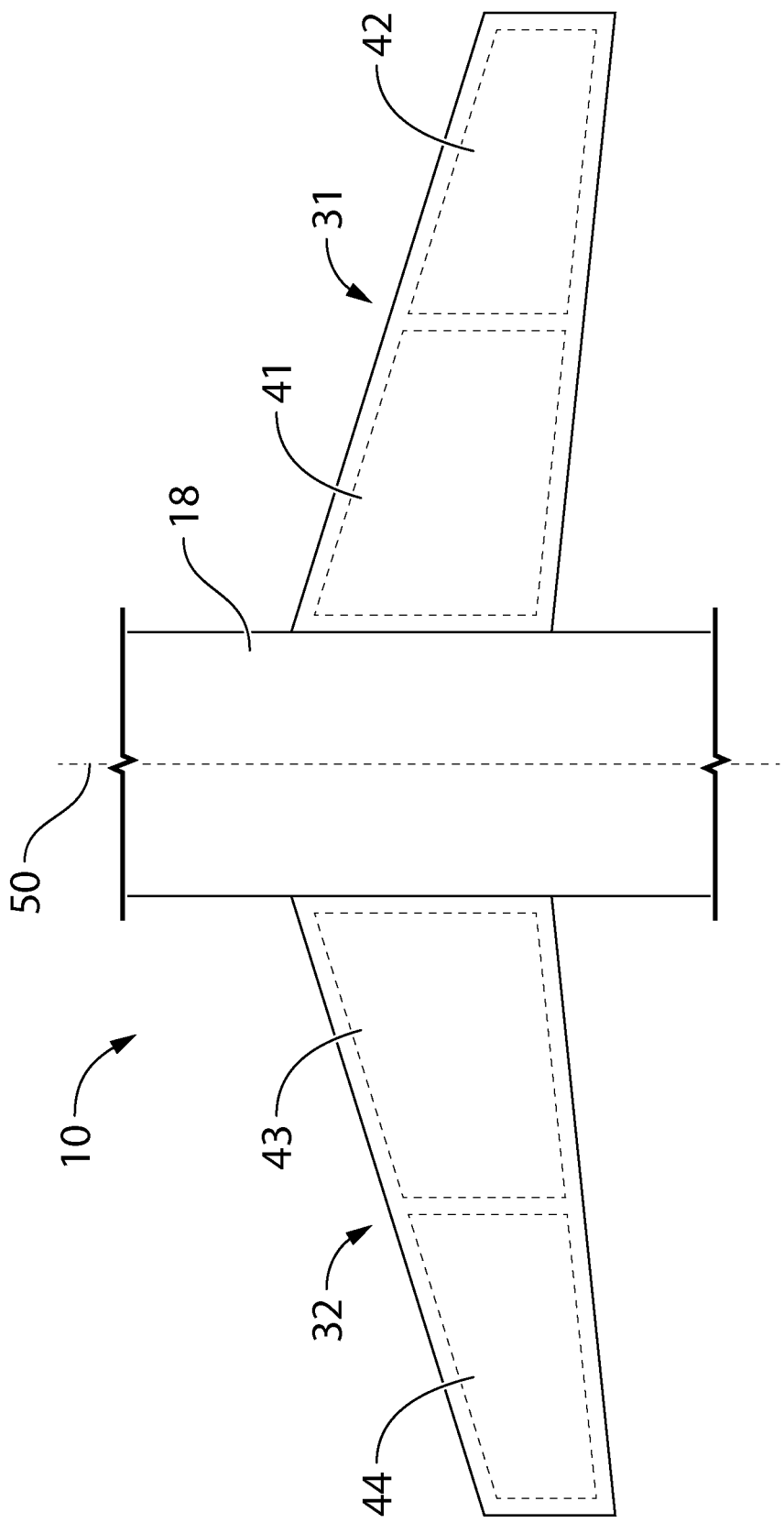
FIG. 1B is a diagram of a partial top view of the aircraft of FIG. 1A.

With reference to FIG. 1B, the aircraft 10 comprises a first wing 31 and a second wing 32. The first wing 31 comprises a first tank 41 and a second tank 42. The second wing 32 comprises a third tank 43 and a fourth tank 44. The tanks 41, 42, 43, 44 are for holding fuel for the aircraft 10. The tanks 41, 42, 43, 44 may have various volumetric shapes and may be positioned inside the wings 31, 32 in any suitable manner. In the illustrated embodiment, the first tank 41 and the third tank 43 are inboard tanks, the second tank 42 and the fourth tank 44 are outboard tanks. For the purposes of the present disclosure, the first wing 31 is referred to as a right wing on a right side of the aircraft 10 and the second wing 32 is referred to as a left wing on a left side of the aircraft 10. A longitudinal axis 50 is defined along the fuselage 18. Each of the tanks 41, 42, 43, 44 has a configuration corresponding to a volumetric shape and a position in one of the wings 31, 32. The volumetric shape of a tank refers to the form of the tank such as the size, position, height, width and length of various surfaces that define the tank. The position of a tank refers to the location of the tank in one of the wings 31, 32 of the aircraft 10. The configuration of each of the tanks 41, 42, 43, 44, i.e. the volumetric shape and position, may vary from one tank to another. The amount of fuel in each of the tanks 41, 42, 43, 44 and the configuration of each of the tanks 41, 42, 43, 44 are used to determine the lateral center of gravity of the aircraft 10.

In some embodiments, the aircraft 10 comprises one or more additional tanks for holding fuel. The one or more additional tanks may be positioned in the wings 31, 32 or the fuselage 18. By way of a specific and non-limiting example, the aircraft 10 may comprises a rear fuselage tank. In some embodiments, the amount of fuel in each of the tanks 41, 42, 43, 44 and the one or more additional tanks and the configuration of each of the tanks 41, 42, 43, 44 and the one or more additional tanks are used to determine the lateral center of gravity of the aircraft 10.

Figure 1C:
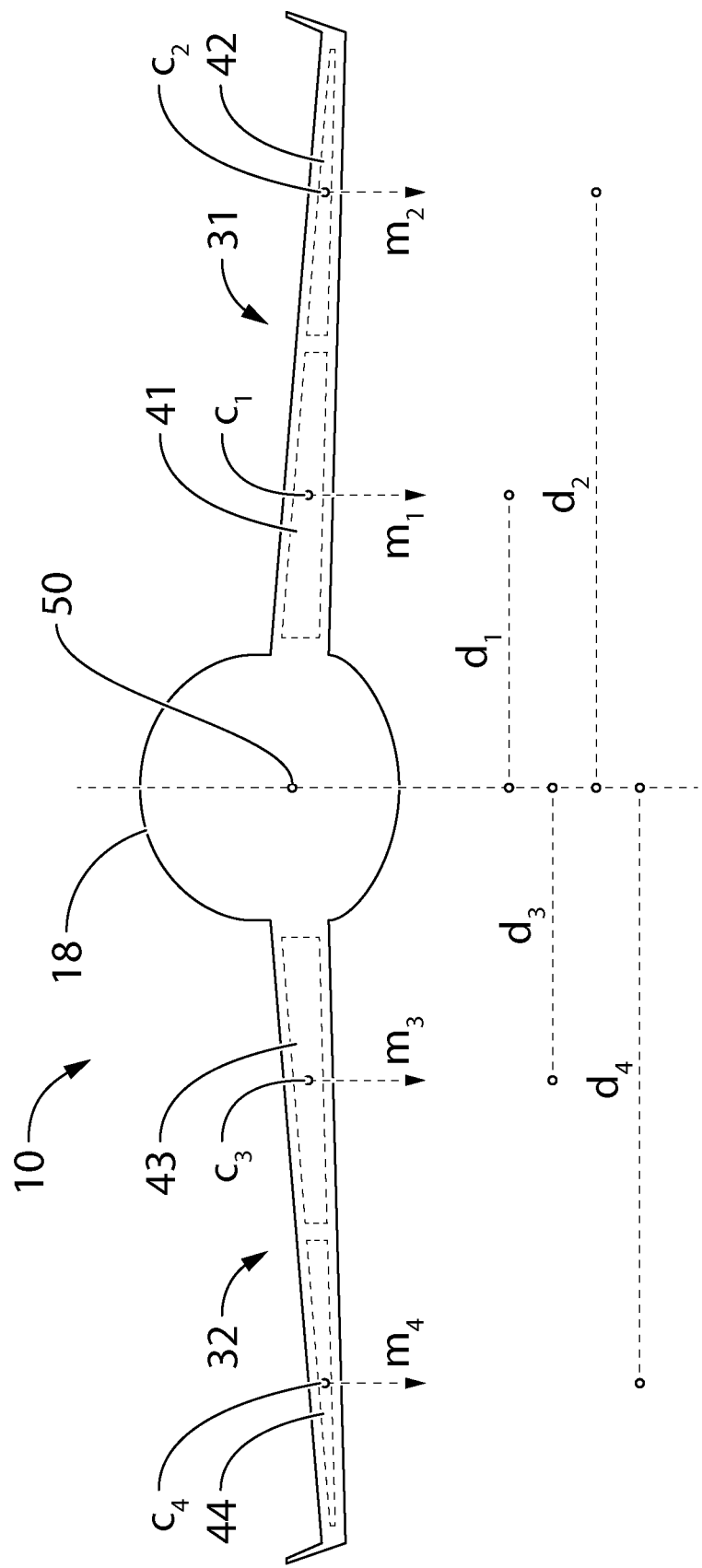
FIG. 1C is a diagram of a cross sectional forward/aft view of the aircraft of FIG. 1A taken through wings of the aircraft.

Referring to FIG. 1C, each of the tanks 41, 42, 43, 44 has a corresponding mass of fuel $m_1$, $m_2$, $m_3$, $m_4$. Each mass of fuel $m_1$, $m_2$, $m_3$, $m_4$ has a corresponding center of mass $c_1$, $c_2$, $c_3$, $c_4$. The position of each center of mass $c_1$, $c_2$, $c_3$, $c_4$ may be represented by a lateral distance from the longitudinal axis 50 of the aircraft 10, substantially centered within the fuselage 18. More specifically, a lateral distance $d_1$ exemplifies the position of the center of mass $c_1$ of the mass of fuel $m_1$ of the first tank 41, a lateral distance $d_2$ exemplifies the position of the center of mass $c_2$ of the mass of fuel $m_2$ of the second tank 42, a lateral distance $d_3$ exemplifies the position of the center of mass $c_3$ of the mass of fuel $m_3$ of the third tank 43, a lateral distance $d_4$ exemplifies the position of the center of mass $c_4$ of the mass of fuel $m_4$ of the fourth tank 44. In some embodiments, the lateral distances $d_1$, $d_2$, $d_3$, $d_4$ and the masses of fuel $m_1$, $m_2$, $m_3$, $m_4$ are used to determine the lateral center of gravity of the aircraft 10.

Figure 2:
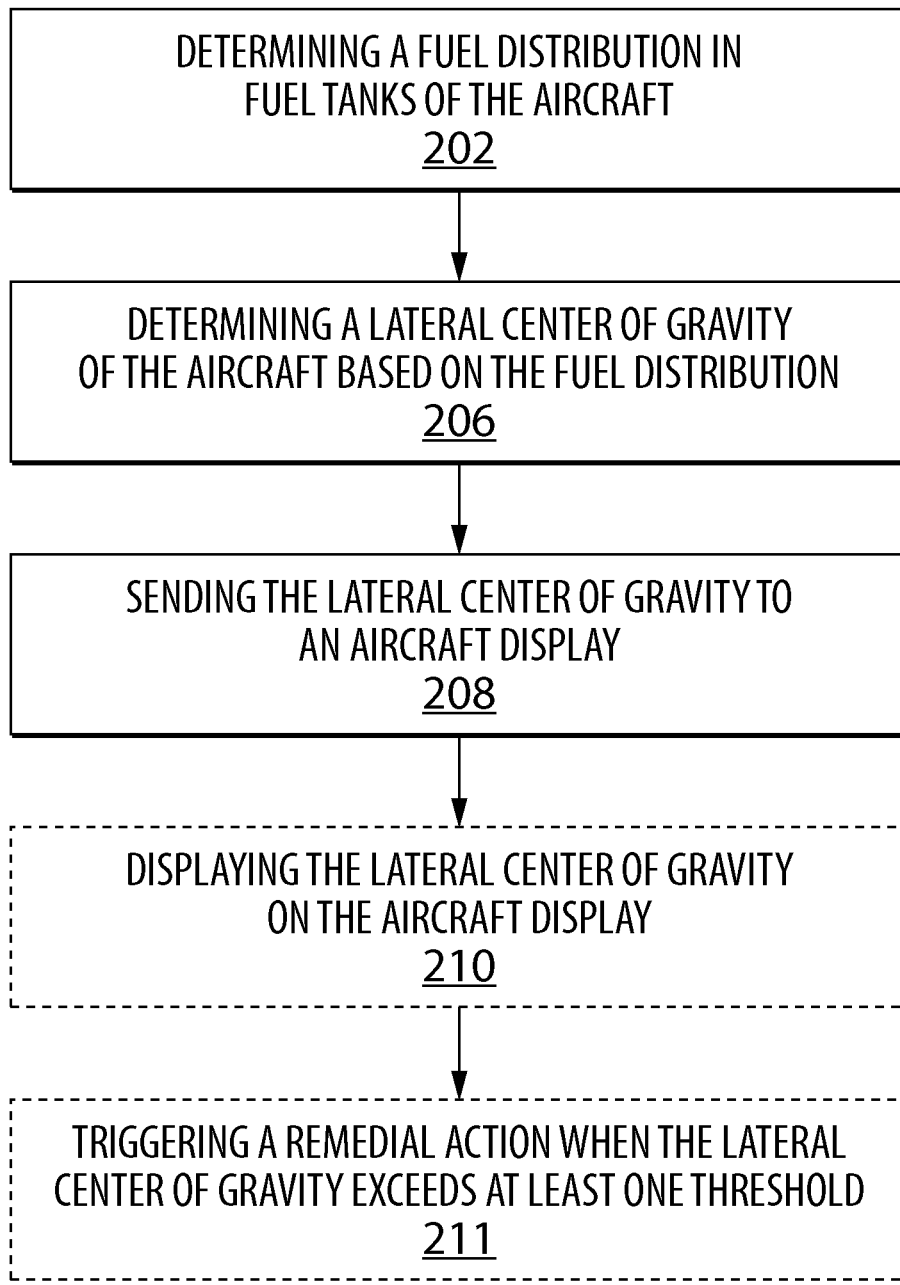
FIG. 2 is a flowchart of a method for providing a lateral center of gravity of an aircraft in accordance with an embodiment.

With reference to FIG. 2, there is illustrated a flowchart of an example method 200 for providing a lateral center of gravity of an aircraft on an aircraft display, such as the aircraft 10 of FIGS. 1A, 1B and 1C. While the method 200 is described herein with reference to the aircraft 10, the method 200 may be applied to other types of aircraft.

At step 202, a fuel distribution in the fuel tanks of the aircraft 10 is determined. For example, in an embodiment where there are four fuel tanks such as the first tank 41, the second tank 42, the third tank 43 and the fourth tank 44, the fuel distribution is determined across the fuel tanks 41, 42, 43 and 44. If more than four fuel tanks are present on aircraft 10, the fuel distribution may be determined across all of the fuel tanks in the aircraft 10.

The fuel distribution may be determined in various manners depending on practical implementations. For example, determining the fuel distribution may comprise determining each mass of fuel $m_1$, $m_2$, $m_3$, $m_4$ and the position of each center of mass $c_1$, $c_2$, $c_3$, $c_4$. If more than four tanks are present, determining the fuel distribution may comprise determining a mass of fuel in each tank and position of a center of mass for each tank. By way of another example, fuel density and fuel volume measurements of tanks 41, 42, 43 and 44 may be used to determine the fuel distribution.

At step 206, a lateral center of gravity of the aircraft 10 is determined based on the fuel distribution. For example, the lateral center of gravity of the aircraft 10 is determined based on the distribution of fuel in the tanks 41, 42, 43, 44 of the wings 31, 32 of the aircraft 10.

At step 208, a signal indicative of the lateral center of gravity is sent to the aircraft display. The signal indicative of the lateral center of gravity may be sent directly to the aircraft display or via another aircraft component. The signal indicative of the lateral center of gravity may be sent via wireless or wired means, depending on the practical implementations of a communication system of the aircraft.

At step 210, optionally, the lateral center of gravity is displayed on the aircraft display. The lateral center of gravity may be displayed on the aircraft display in any suitable manner, including via a numerical value, a textual indication, a visual icon or a graphical indicator, an embodiment of which will be described in more detail below. At step 211, optionally, a remedial action is triggered when the lateral center of gravity exceeds at least one threshold, as will be explained in more detail below.

Figure 3A:
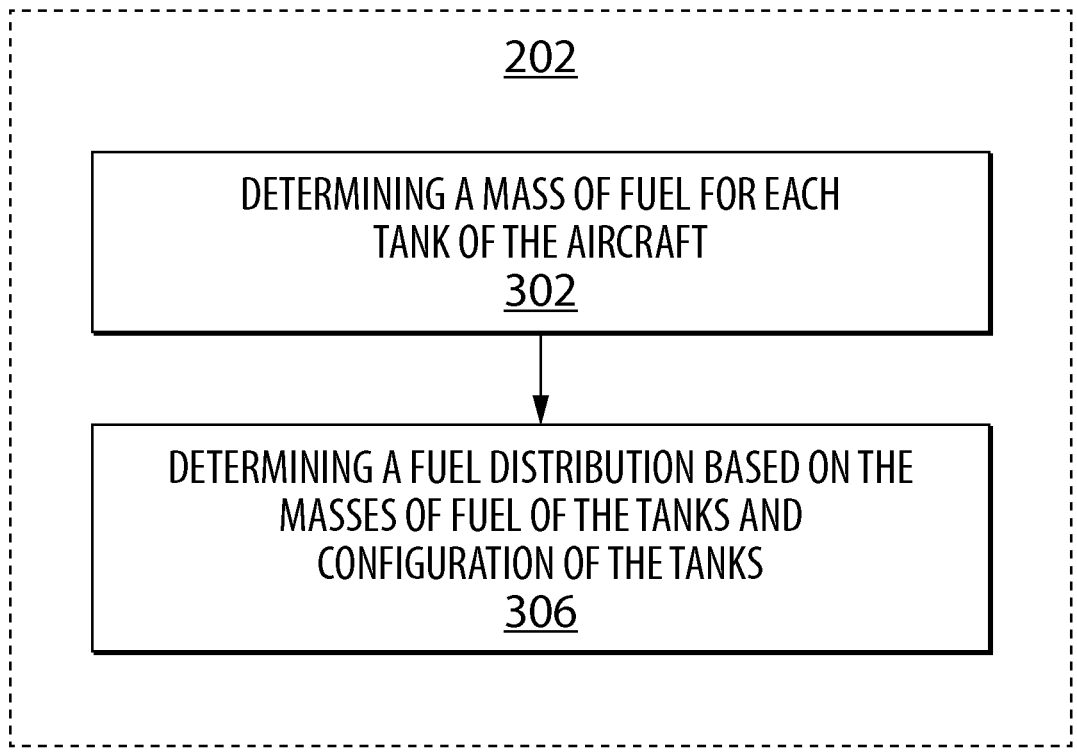
FIG. 3A is a flowchart illustrating an example embodiment for determining a fuel distribution in fuel tanks.

With reference to FIG. 3A, there is illustrated an example embodiment for determining the fuel distribution, as per step 202 of FIG. 2, when there are two tanks present on each aircraft wing. At step 302, the mass $m_1$ in the first tank 41 is determined, the mass $m_2$ in the second tank 42 is determined, the mass $m_3$ in the third tank 43 is determined and the mass $m_4$ in the fourth tank 44 is determined.

The masses $m_1$, $m_2$, $m_3$, $m_4$ may be determined from fuel density and fuel volume measurements of the tanks 41, 42, 43, 44. The masses $m_1$, $m_2$, $m_3$, $m_4$ may be determined by the product of fuel volume and fuel density and represented by the following equations:

$$m_1 = V_1 p_1, \tag{1}$$

$$m_2 = V_2 p_2, \tag{2}$$

$$m_3 = V_3 p_3, \tag{3}$$

$$m_4 = V_4 p_4, \tag{4}$$

where $V_1$, $V_2$, $V_3$, $V_4$ correspond to fuel volume in the first tank 41, the second tank 42, the third tank 43, and the fourth tank 44, respectively, and $p_1$, $p_2$, $p_3$, $p_4$ correspond to fuel density in the first tank 41, the second tank 42, the third tank 43 and the fourth tank 44, respectively.

Fuel density in the tanks may be determined in any suitable manner. For example, fuel density may be measured by a fuel density measuring device comprising one or more sensors for measuring density of fuel. In some embodiments, the fuel density measuring device comprises a hydrometer configured to determine density of a liquid. Other manners for determining fuel density in the tanks are contemplated, including via one or more look-up table(s) or schedule(s), among other possibilities. In some embodiments, an analytical fuel density is used, which may depend on one or more of fuel type, temperature and pressure.

Fuel volume in the tanks may be determined in any suitable manner. For example, fuel volume may be measured by a fuel volume measuring device comprising one or more sensors. In some embodiments, the fuel volume measuring device comprises one or more pressure sensors. In some embodiments, the fuel volume measuring device comprises one or more fuel level sensors. The fuel volume may then be determined depending on the volumetric shape of the tank. One or more of equation(s), look-up table(s), schedule(s) and the like may be used to determine fuel volume from the fuel level and/or the pressure in the fuel tanks. The equation(s), the look-up table(s), and/or the schedule(s) may be predetermined based on the volumetric shape of the tank. Other manners for determining fuel volume are contemplated.

The fuel density and fuel volume determinations may be actively retrieved, or may be passively received. The fuel density and fuel volume determinations of the tanks may be retrieved and/or received from a control system or aircraft computer. In some embodiments, step 302 comprise triggering determination of the fuel density and/or fuel volume of the tanks whenever method 200 is initiated.

At step 306, the fuel distribution is determined based on the mass of fuel $m_1$ in the first tank 41, the mass of fuel $m_2$ in the second tank 42, the mass $m_3$ in the third tank 43, the mass $m_4$ in the fourth tank 44 and a configuration of the first tank 41, the second tank 42, the third tank 43 and the fourth tank 44. In some embodiments, determining the first fuel distribution comprises determining the position of the center of mass $c_1$ in the first tank 41, determining the position of the center of mass $c_2$ in the second tank 42, determining the position of the center of mass $c_3$ in the third tank 43 and determining the position of the center of mass $c_4$ in the fourth tank 44. In some embodiments, determining the position of the center of mass $c_1$ comprises determining the lateral distance $d_1$ between the center of mass $c_1$ and the longitudinal axis 50. Similarly, in some embodiments, determining the position of the center of mass $c_2$ comprises determining the lateral distance $d_2$ between the center of mass $c_2$ and the longitudinal axis 50. In some embodiments, determining the position of the center of mass $c_3$ comprises determining the lateral distance $d_3$ between the center of mass $c_3$ and the longitudinal axis 50. In some embodiments, determining the position of the center of mass $c_4$ comprises determining the lateral distance $d_4$ between the center of mass $c_4$ and the longitudinal axis 50.

The positions of the center of masses may be determined in any suitable manner. For example, the position of the center of mass in the fuel tank may be determined based on the fuel density and fuel volume of the tank and the configuration of the tank. One or more of equation(s), look-up table(s), schedule(s) and the like may be used to determine the position of the center of mass in the fuel tank from the fuel density and fuel volume measurements of the tank. The equation(s), look-up table(s) and/or schedule(s) may be predetermined based on the configuration of the tank. Other manners for determining the positions of the center of masses are contemplated.

In some embodiments, the lateral distances $d_1$, $d_2$ correspond to positive values and the lateral distances $d_3$, $d_4$ correspond to negative values. In other words, a positive value for a lateral distance from a center of mass to the substantially centered longitudinal axis 50 indicates a position on the right side of the aircraft 10 and a negative value for a lateral distance from a center of mass to the substantially centered longitudinal axis 50 indicates a position on the left side of the aircraft 10.

Figure 3B:
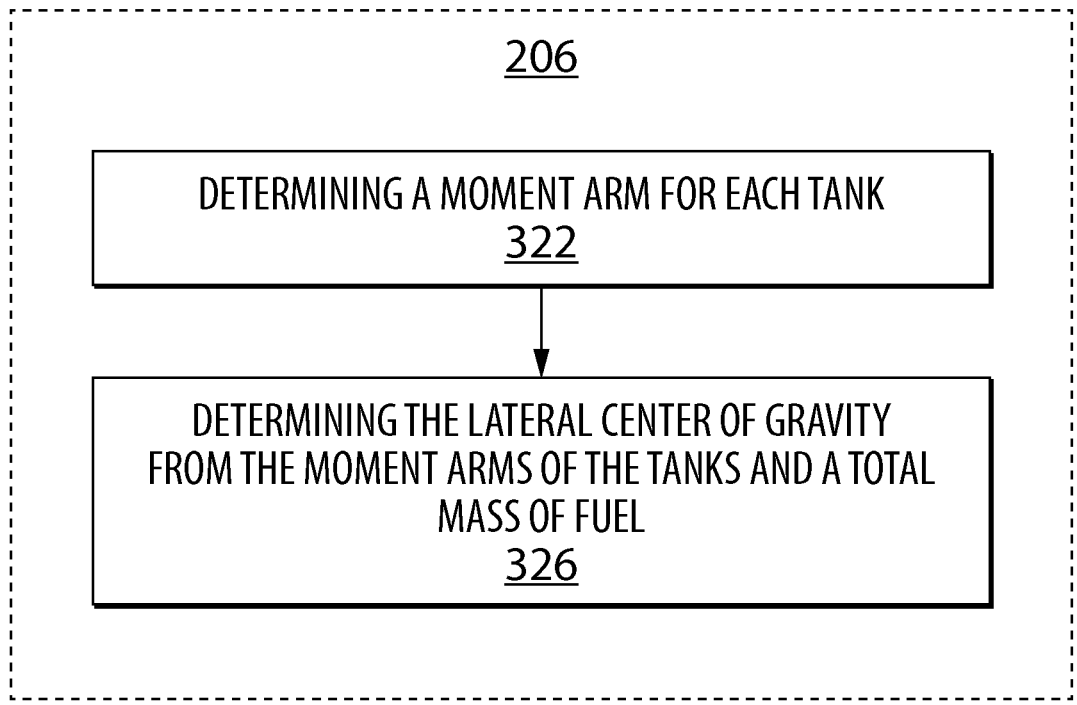
FIG. 3B is a flowchart illustrating an example embodiment for determining a lateral center of gravity of an aircraft.

The lateral center of gravity of the aircraft may be determined based on moment arms of each of the fuel tanks in the aircraft, such as fuel tanks 41, 42, 43, 44 in the wings 31, 32. With reference to FIG. 3B, there is illustrated an example embodiment for determining the lateral center of gravity of the aircraft 10, as per step 206 of FIG. 2. At step 322, a moment arm is determined for each tank 41, 42, 43, 44. Each lateral distance $d_1$, $d_2$, $d_3$, $d_4$ may be referred to as an "arm". Each moment arm may be determined from the fuel distribution. A moment for each fuel tank 41, 42, 43, 44 may be determined by multiplying each mass $m_1$, $m_2$, $m_3$, $m_4$ by its corresponding arm $d_1$, $d_2$, $d_3$, $d_4$. At step 326, the lateral center of gravity may be determined from the moment arms and a sum of the masses of fuel. The lateral center of gravity may be determined from the sum of the moment arms divided by the sum of the masses of fuel. Accordingly, the determination of the lateral center of gravity CG may be determined on a moment arm basis and may be represented by the following equation:

$$CG = \frac{d_1 m_1 + d_2 m_2 + d_3 m_3 + d_4 m_4}{m_1 + m_2 + m_3 + m_4}, \quad (5)$$

If more than four tanks are present, the lateral center of gravity CG may be determined in a similar manner based on the fuel masses and center of masses of all tanks in the aircraft.

Figure 3C:
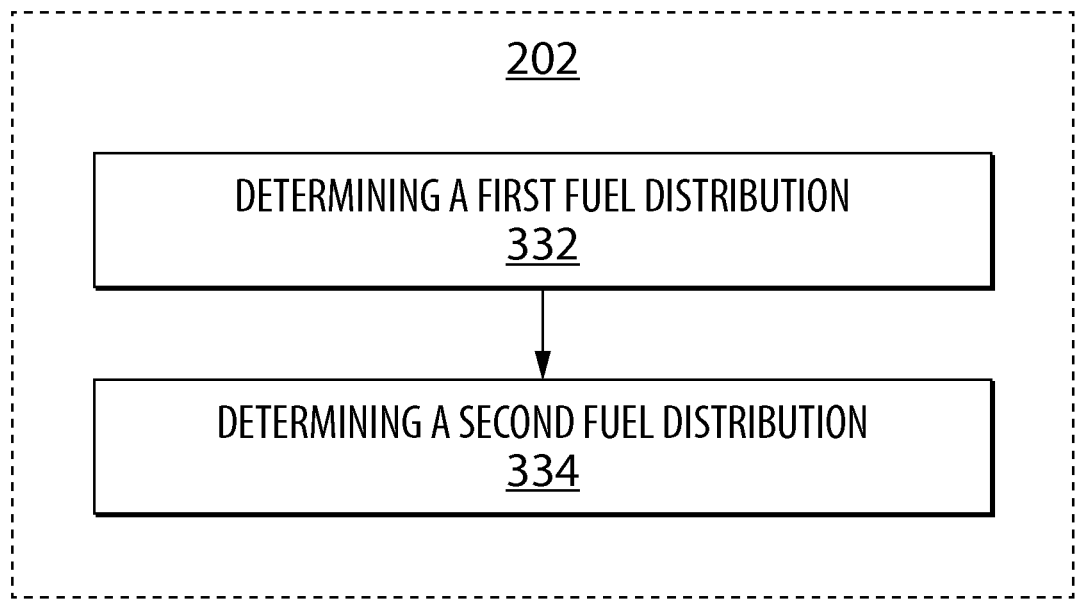
FIG. 3C is a flowchart illustrating another example embodiment for determining a fuel distribution.

With reference to FIG. 3C, there is illustrated another example embodiment for determining the fuel distribution, as per step 202 of FIG. 2. At step 332, a first fuel distribution between fuel tanks of the first wing 31 of the aircraft 10 is determined. At step 334, a second fuel distribution between fuel tanks of the second wing 32 of the aircraft 10 is determined. For example, in an embodiment where there are two fuel tanks on the first wing 31 such as the first tank 41 and the second tank 42, the first fuel distribution is determined across fuel tanks 41 and 42. Similarly, for example, in an embodiment where there are two fuel tanks on the second wing 32 such as the third tank 43 and the fourth tank 44, the second fuel distribution is determined across fuel tanks 43 and 44. If more than two fuel tanks are present on the first wing, the first fuel distribution is determined across all of the fuel tanks on the first wing. Similarly, if more than two fuel tanks are present on the second wing, the second fuel distribution is determined across all of the fuel tanks in the second wing.

Figure 3D:
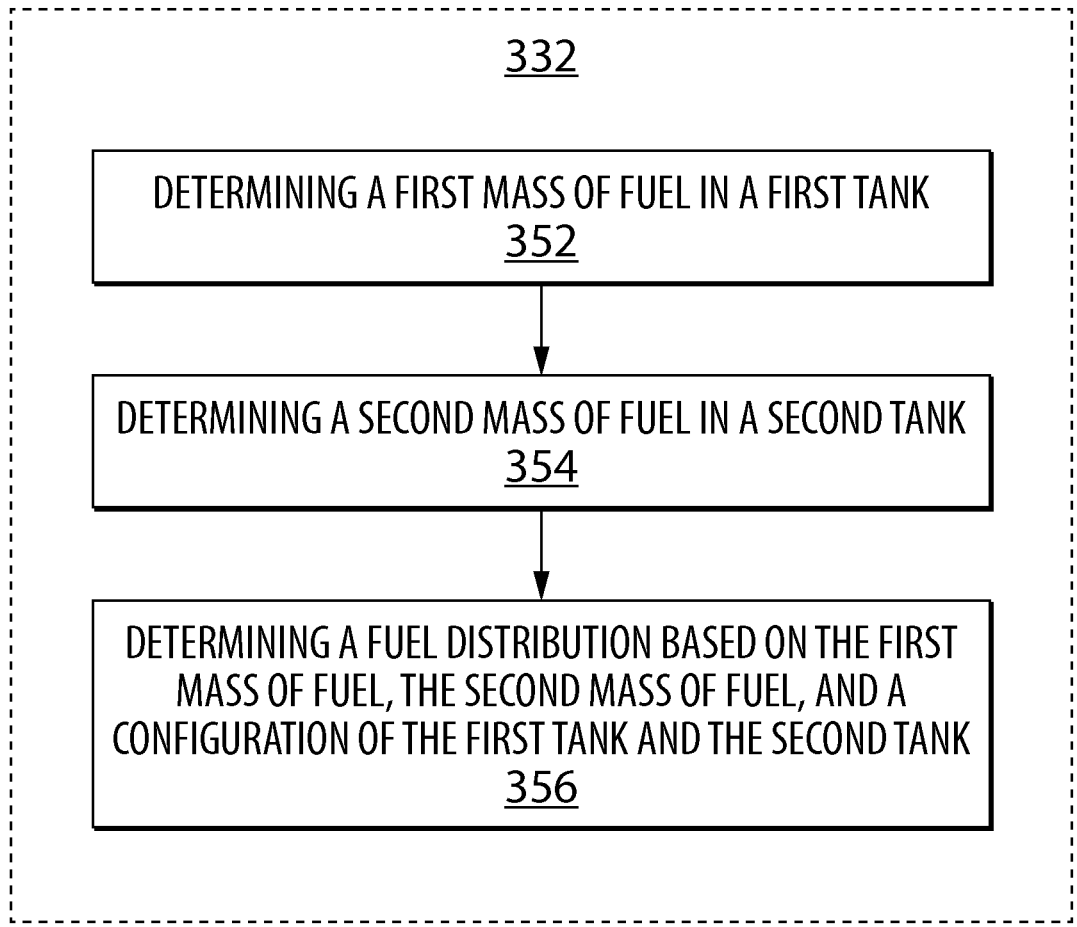
FIG. 3D is a flowchart illustrating an example embodiment for determining a fuel distribution in two tanks.

With reference to FIG. 3D, there is illustrated an example embodiment for determining the first fuel distribution, as per step 332 of FIG. 3C, when there are two tanks present on an aircraft wing. At step 352, the mass $m_1$ in the first tank 41 is determined. At step 354, the mass $m_2$ in the second tank 42 is determined. At step 356, the first fuel distribution is determined based on the mass of fuel $m_1$ in the first tank 41, the mass of fuel $m_2$ in the second tank 42, and a configuration of the first tank 41, the second tank 42. The first fuel distribution may be determined in various manners depending on practical implementations. For example, determining the first fuel distribution may comprise determining a total mass of fuel in the first wing 31 and a position of a center of mass of the total mass of fuel in the first wing 31. The total mass of fuel in the first wing 31 and the position of the center of mass of the total mass of fuel in the first wing 31 may be determined from the masses of fuel $m_1$, $m_2$ and the positions of the center of masses $c_1$, $c_2$. In some embodiments, determining the first fuel distribution comprises determining the position of the center of mass $c_1$ and the position of the center of mass $c_2$. In some embodiments, determining the position of the center of mass $c_1$ comprises determining the lateral distance $d_1$ and determining the position of the center of mass $c_2$ comprises determining the lateral distance $d_2$. By way of another example, fuel density and fuel volume measurements of the first tank 41 and the second tank 42 may be used to determine the total mass of fuel in the first wing 31 and the position of the center of mass of the total mass of fuel in the first wing 31. The second fuel distribution may be determined in various manners depending on practical implementations. The second fuel distribution may be determined in a similar manner as the first fuel distribution or differently therefrom. Note that the number of fuel tanks on the first wing 31 may differ from the number of fuel tanks on the second wing 32.

In some embodiments, determining the second fuel distribution comprises determining the masses of fuel $m_3$, $m_4$, the position of the center of mass $c_3$ and the position of the center of mass $c_4$. In some embodiments, determining the position of the center of mass $c_3$ comprises determining the lateral distance $d_3$ and determining the position of the center of mass $c_4$ comprises determining the lateral distance $d_4$.

Figure 3E:
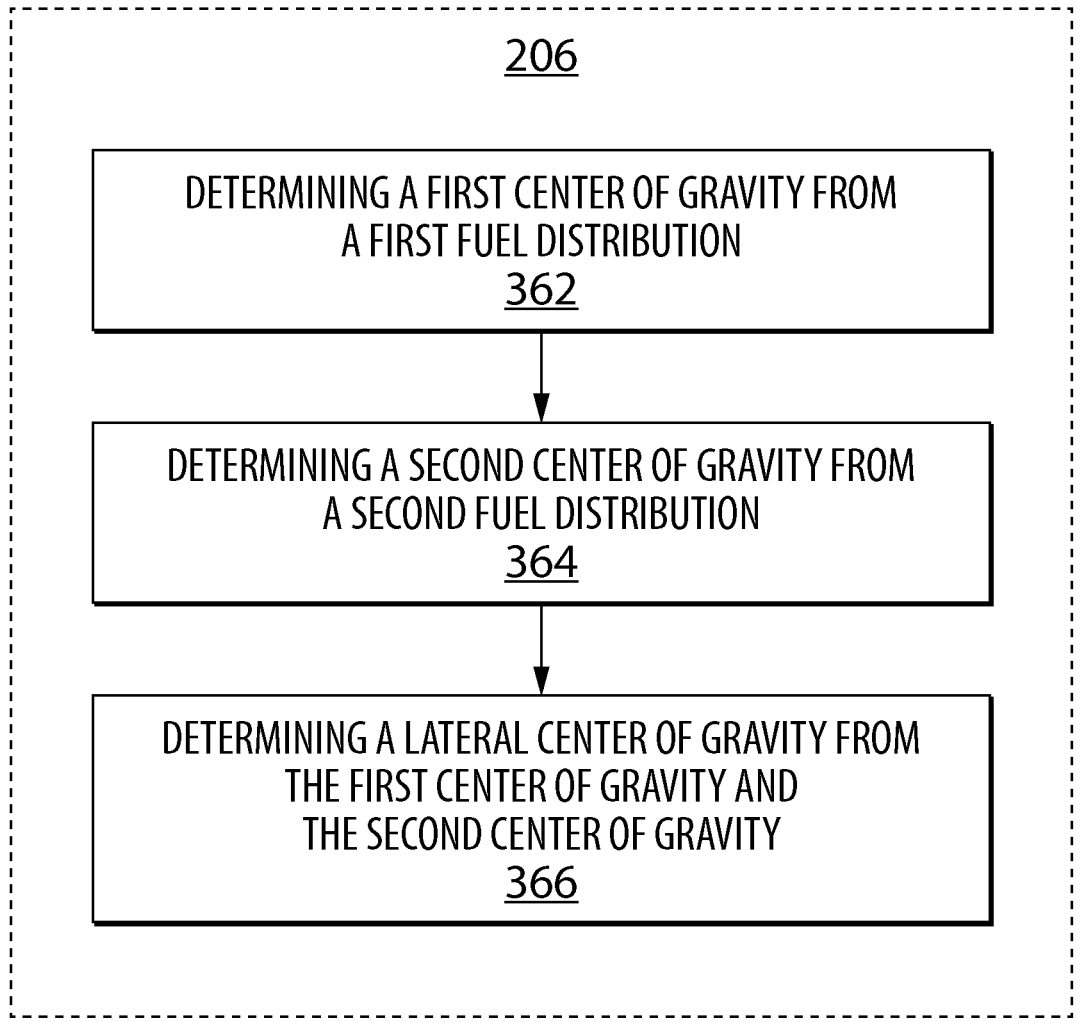
FIG. 3E is a flowchart illustrating another example embodiment for determining a lateral center of gravity of an aircraft.

With reference to FIG. 3E, there is illustrated another example embodiment for determining the lateral center of gravity of the aircraft 10, as per step 206 of FIG. 2. At step 362, a first center of gravity is determined from the first fuel distribution. The first center of gravity is a center of gravity of the first wing 31. In some embodiments, the first center of gravity is determined based on the masses $m_1$, $m_2$ and the lateral distances $d_1$, $d_2$. By way of a specific and non-limiting example, equation (6) may be used to determine the first center of gravity $CG_1$. It is noted that the sum of the masses $m_1$, $m_2$ is a total mass of fuel in the first wing 31.

$$CG_1 = \frac{d_1 m_1 + d_2 m_2}{m_1 + m_2}, \quad (6)$$

At step 364, a second center of gravity is determined from the second fuel distribution. The second center of gravity may be determined in a similar manner as the first center of gravity, for example based on the masses of fuel $m_3$, $m_4$ and the lateral distances $d_3$, $d_4$. The second center of gravity $CG_2$ may be represented by the following equation:

$$CG_2 = \frac{d_3 m_3 + d_4 m_4}{m_3 + m_4}, \quad (7)$$

It is noted that the sum of the masses of fuel $m_3$, $m_4$ is a total mass of fuel in the second wing 31.

At step 366, the lateral center of gravity is determined from the first center of gravity $CG_1$ and the second center of gravity $CG_2$. For example, equation (8) may be used to obtain the lateral center of gravity CG of the aircraft. It is noted that the sum of the masses of fuel $m_1$, $m_2$, $m_3$, $m_4$ corresponds to a total fuel mass in the first wing 31 and the second wing 32.

$$CG = \frac{(m_1 + m_2)CG_1 + (m_3 + m_4)CG_2}{m_1 + m_2 + m_3 + m_4}, \quad (8)$$

In some embodiments, the fuel distribution may be determined based on fuel volume measurements without fuel density measurements. For example, fuel density may be estimated or approximated for the purposes of determine the masses of fuel $m_1$, $m_2$, $m_3$, $m_4$ and the positions of the center of masses $c_1$, $c_2$, $c_3$, $c_4$.

Figure 4A:
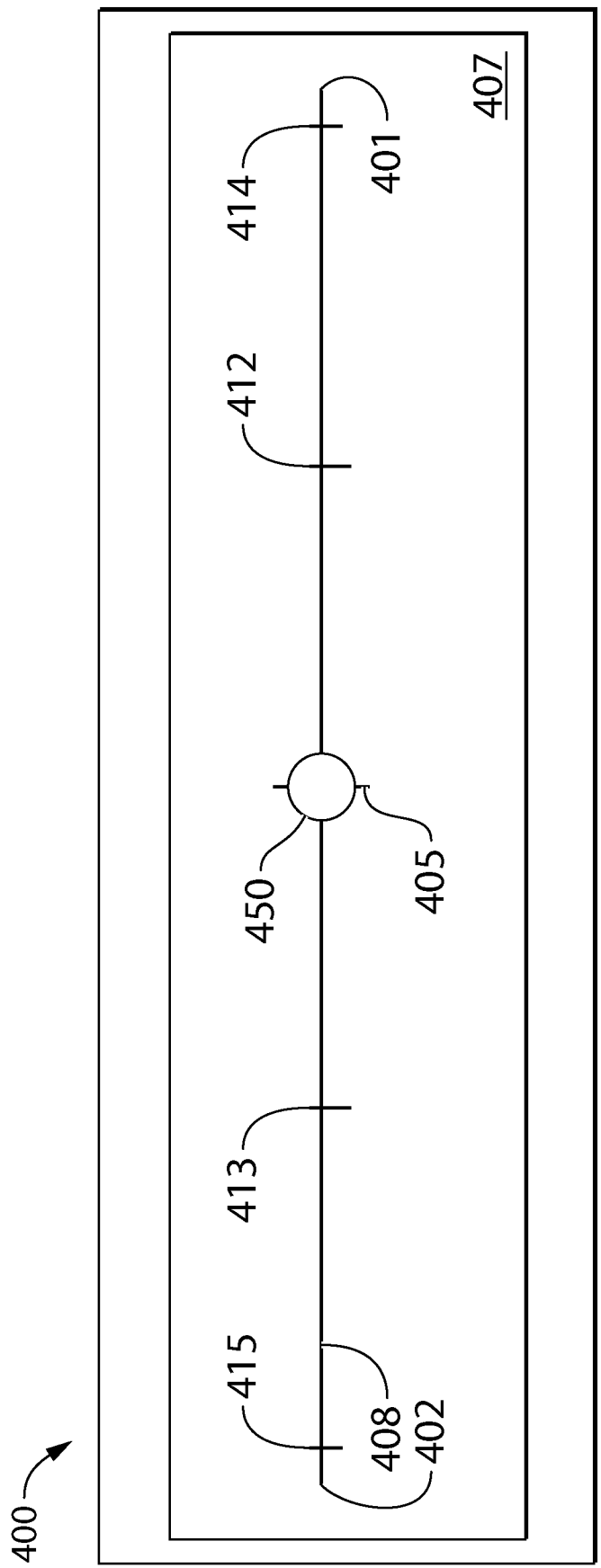
FIG. 4A is an example of a lateral center of gravity display illustrating a substantially balanced lateral center of gravity of an aircraft.

FIG. 4A is a specific and non-limiting example of an aircraft display 400 for displaying the lateral center of gravity of the aircraft. As illustrated, the aircraft display 400 comprises a graphical indicator 407. The graphical indicator 407 includes a segment 408 that extends from a first end 401 to a second end 402. A central marker 405 is substantially centered between the first end 401 and the second end 402 to represent a balanced lateral center of gravity of the aircraft 10. A pointer 450 is displaceable along the segment 408 between the first end 401 and the second end 402. The pointer 450 is indicative of a position of the lateral center of gravity of the aircraft 10. A position of the pointer 450 along the segment 408 is indicative of one of a balanced lateral center of gravity, a left wing imbalance, and a right wing imbalance as a function of a relative position of the pointer 450 with the central marker 405. A right wing imbalance refers to the lateral center of gravity of the aircraft 10 being offset from the longitudinal axis 50 towards the right wing 31. A left wing imbalance refers to the lateral center of gravity of the aircraft 10 being offset from the longitudinal axis 50 towards the left wing 32.

Note that while the pointer 450 is illustrated as a circle, various other shapes may also be used. In addition, the pointer 450 may be represented by a line, an icon, a letter, a number, or any other graphical element. Its position on the graphical indicator 407 may also vary. For example, it may be displayed above or below the segment 408, instead of overlaid thereon as illustrated. In yet another embodiment, the pointer 450 is represented by a change in color of a portion of the segment 408, as a function of the position of the pointer 450. Other embodiments will be readily understood by those skilled in the art.

A left wing imbalance is displayed when the pointer 450 is between the central marker 405 and the second end 402. A right wing imbalance is displayed when the pointer 450 is between the central marker 405 and the first end 401. A balanced lateral center of gravity is displayed when the pointer 450 is aligned with the central marker 405. As the pointer 450 gets closer to the first end 401, the right wing imbalance increases. As the pointer 450 gets closer to the second end 402, the left wing imbalance increases. In some embodiments, numerical values may be presented on the graphical indicator 407 for indicating a degree of lateral center of gravity imbalance.

In some embodiments, a first threshold marker 412 and a second threshold marker 413 are provided along the segment 408. Each threshold marker 412, 413 is spaced equidistantly from the center marker 405 towards a respective one of the first end 401 and the second end 402. In some embodiments, the threshold markers 412, 413 correspond to a fuel rebalancing threshold for each aircraft wing. For example, if the pointer 450 exceeds the first threshold marker 412 towards the first end 401, then this is indicative of a need for rebalancing of fuel between at least some of the fuel tanks in the aircraft due to a right wing imbalance of the lateral center of gravity. Similarly, if the pointer 450 exceeds the second threshold marker 413 towards the second end 402, then this is indicative of a need for rebalancing of fuel between at least some of the fuel tanks due to a left wing imbalance of the lateral center of gravity. In each case, the direction of imbalance, i.e. a left wing imbalance or a right wing imbalance, will inform the decision on how to rebalance the fuel in order to achieve a balanced later center of gravity for the aircraft. Note that the rebalancing may be performed automatically or manually.

In some embodiments, a third threshold marker 414 and a fourth threshold marker 415 are provided along the segment 408. The third threshold marker 414 is spaced from the first threshold marker 412 towards the first end 401. The fourth threshold marker 415 is spaced from the second threshold marker 413 towards the second end. The threshold markers 414, 415 may be used to represent another level of imbalance, beyond the need for rebalancing of fuel. For example, the threshold markers 414, 415 may correspond to a crew alert system (CAS) imbalance threshold. When the pointer 450 exceeds threshold marker 414 towards the first end 401 or threshold marker 415 towards the second end 402, this is indicative of a need to alert the crew as the imbalance of the lateral center of gravity has reached a significant level.

Figure 4B:
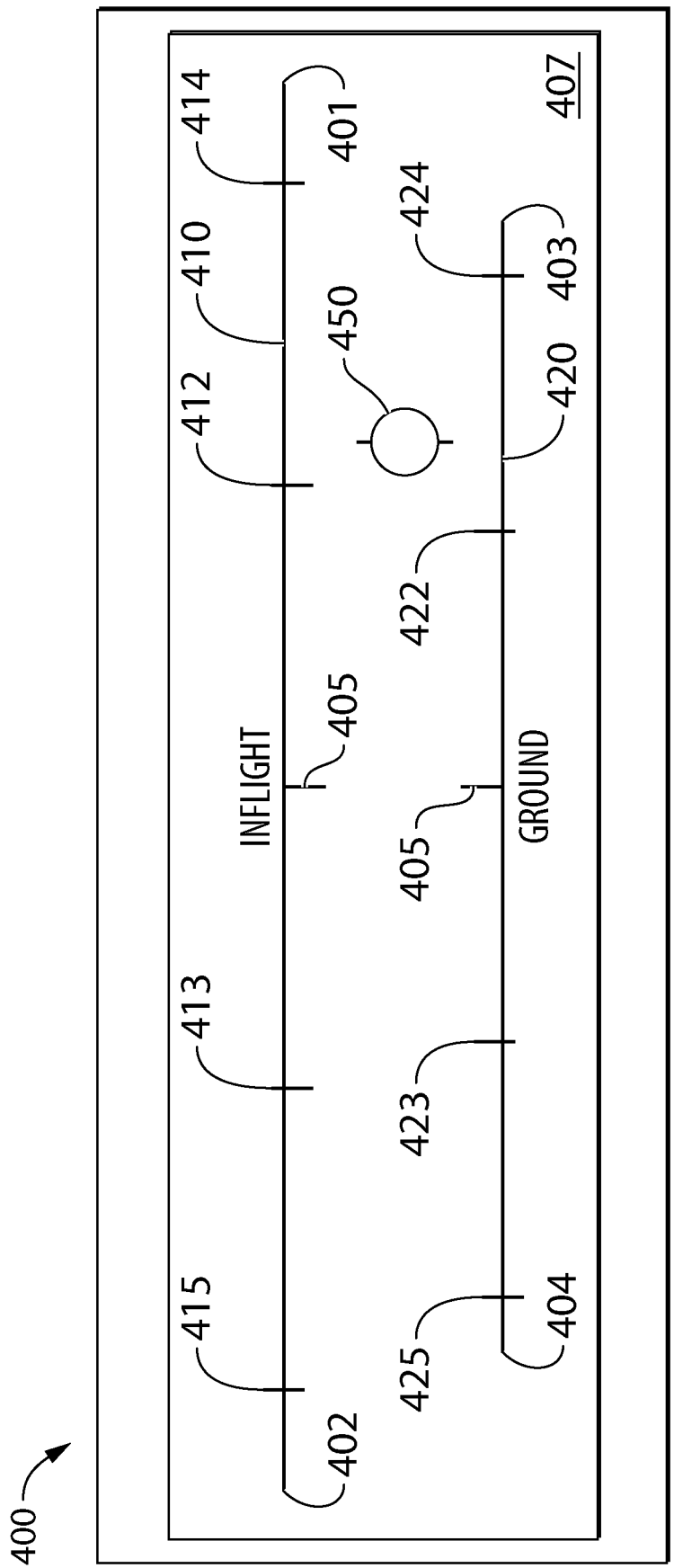
FIG. 4B is an example of a lateral center of gravity display illustrating a right wing lateral center of gravity imbalance.

With reference to FIG. 4B, there is illustrated another embodiment for the aircraft display 400. In this example, the graphical indicator 407 comprises first segment 410 and second segment 420. As illustrated, the first and second segments 410, 420 are positioned one above the other and the pointer 450 is positioned therebetween. Alternatively, a pointer 450 may be displayed on each segment 410, 420, or on an active one of the segments 410, 420 as a function of the status of the aircraft. The first segment 410 may be used when the aircraft 10 is in flight and the second segment 420 may be used when the aircraft 10 is on the ground. The first segment 410 extends from the first end 401 to the second end 402 and the threshold markers 412, 413, 414, 415 are associated with the first segment 410. The second segment 420 extends from a third end 403 to a fourth end 404 and has threshold markers 422, 423, 424, 425 associated therewith. Note that threshold markers 412, 413, 414, 415 may be visually aligned with threshold markers 422, 423, 424, 425 but segments 410, 420 may use different scales. Alternatively, and as illustrated, the same scale is used for both the first segment 410 and the second segment 420, and the position of each threshold marker is adapted as a function of the appropriate threshold for an inflight imbalance and a ground imbalance, respectively.

One or more of the threshold markers 412, 413, 414, 415, 422, 423, 424, 425 may correspond to remedial action threshold markers. That is, if the pointer 450 exceeds one of the threshold markers 412, 413, 414, 415, 422, 423, 424, 425, then this is indicative that a remedial action is occurring or needs to occur. The remedial action may be rebalancing of fuel between at least some of the tanks 41, 42, 43, 44, causing an alert indicating that the lateral center of gravity of the aircraft is at dangerous level, and the like.

In some embodiments, a visual element of the graphical indicator 407 is used to identity one of the two segments 410, 420 as active, as a function of the aircraft status. For example, only one of the two segments 410, 420 may be displayed at any one time. In another example, one of the two segments 410, 420 is illuminated while the other of the two segments 410, 420 is darkened. In yet another example, the active segment is displayed in a first color, such as green, while the inactive segment is displayed in a second color, such as red. Other embodiments for visually indicating the active segment are also contemplated. Note that the aircraft status may be determined using any known means, such as using a weight-off wheels conditions of the aircraft 10 or an altitude measurement. The aircraft status may be obtained from various aircraft systems, such as an aircraft computer, an engine computer, and the like.

Figure 4C:
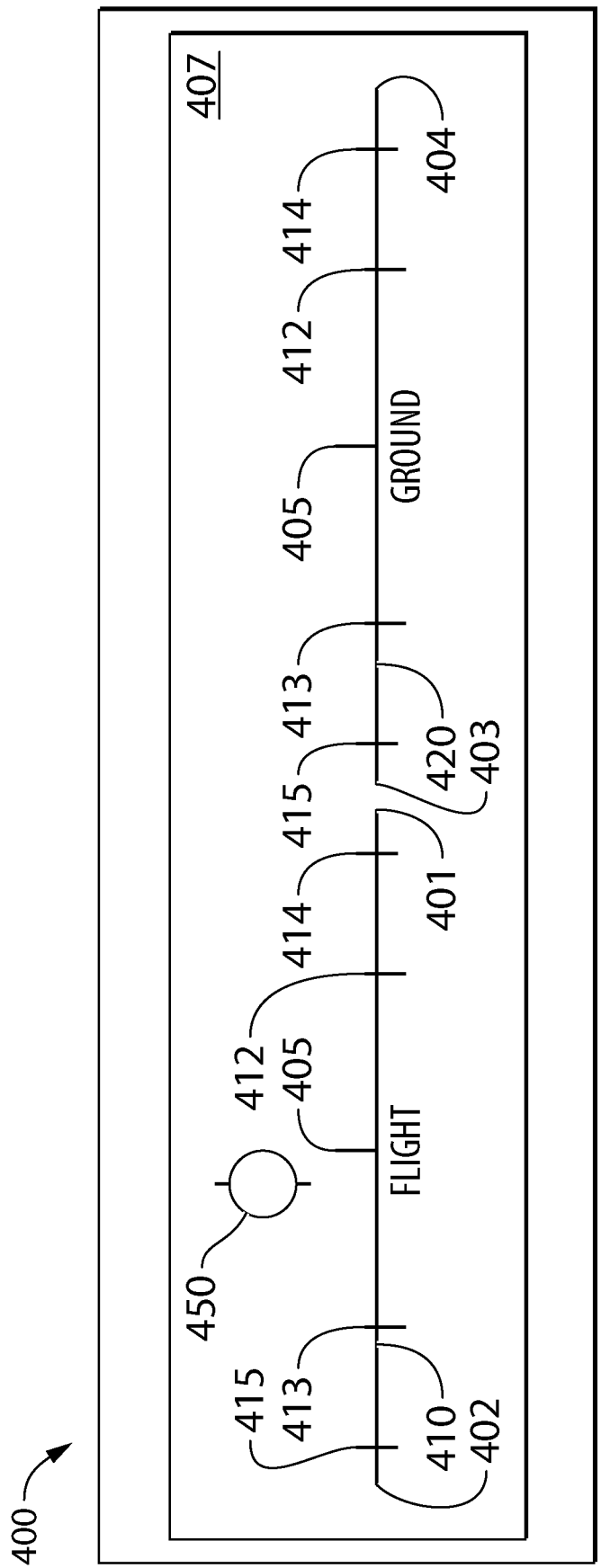
FIG. 4C is an example of a lateral center of gravity display illustrating a left wing lateral center of gravity imbalance.

With reference to FIG. 4C, there is illustrated another embodiment of the graphical indicator 407 having two segments 410, 420. In this example, the first and second segments 410, 420 are positioned side by side. The pointer 450 is positioned above the active segment. In alternative embodiments, the pointer 450 is overlaid on the active segment, or a pointer 450 is provided for each segment 410, 420, while other visual indicators are used to designate the active segment.

The variants with respect to the pointer 450, the nature, position, and size of the threshold markers 412, 413, 414, 415, 422, 423, 424, 425, and any other elements associated with the graphical indicator 407 are applicable to any of the embodiments illustrated in FIGS. 4A-4C.

Figure 5A:
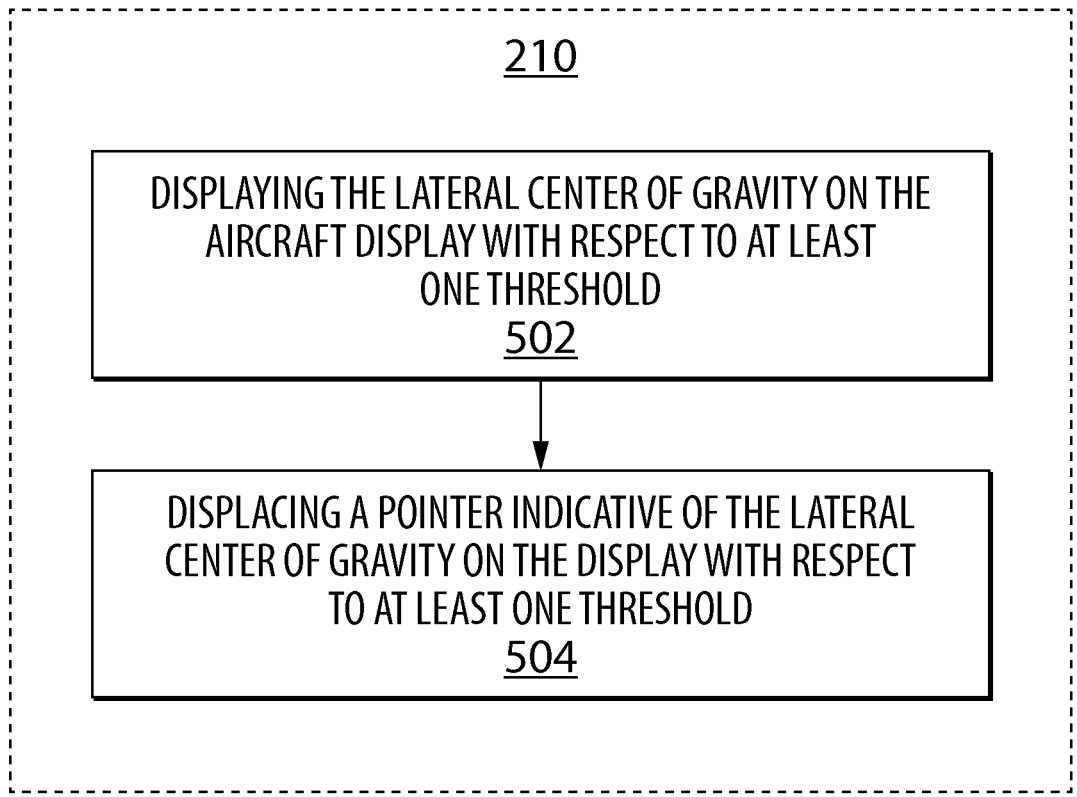
FIG. 5A is a flowchart illustrating example embodiments for displaying a lateral center of gravity of an aircraft.

With reference to FIG. 5A, there is illustrated an example embodiment for displaying the lateral center of gravity on an aircraft display, as per step 210 of FIG. 2. While FIG. 5A is described with reference to the graphical indicator 407 of FIG. 4B, other embodiments may also apply.

At step 502 the lateral center of gravity is displayed on the aircraft display 400 with respect to at least one threshold marker, which may be any one of threshold markers 412, 413, 414, 415, 422, 423, 424, 425. The lateral center of gravity may be displayed by use of the pointer 450. At step 504, the pointer 450 is displaced on the display with respect to the at least one threshold marker when the lateral center of gravity of the aircraft 10 changes.

In some embodiments, the method 200 comprises determining the threshold markers as a function of the total fuel mass and displaying the threshold markers on the graphical indicator of the aircraft display. With additional reference to FIG. 5B, a graphical representation illustrates various thresholds that vary as a function of the total fuel mass. In particular, a first threshold 512, a second threshold 514, a third threshold 522 and a fourth threshold 524 are illustrated. In this example, the first threshold 512 corresponds to the first threshold marker 412 of the first segment 410 and the second threshold 514 corresponds to the third threshold marker 414 of the first segment 410. The third threshold 522 corresponds to the first threshold marker 422 of the second segment 420 and the fourth threshold 524 corresponds to the third threshold marker 424 of the second segment 420. Also in this example, the first and third thresholds 512, 522 are fuel rebalancing thresholds and the second and fourth thresholds 514 and 524 are CAS imbalance thresholds.

Figure 5B:
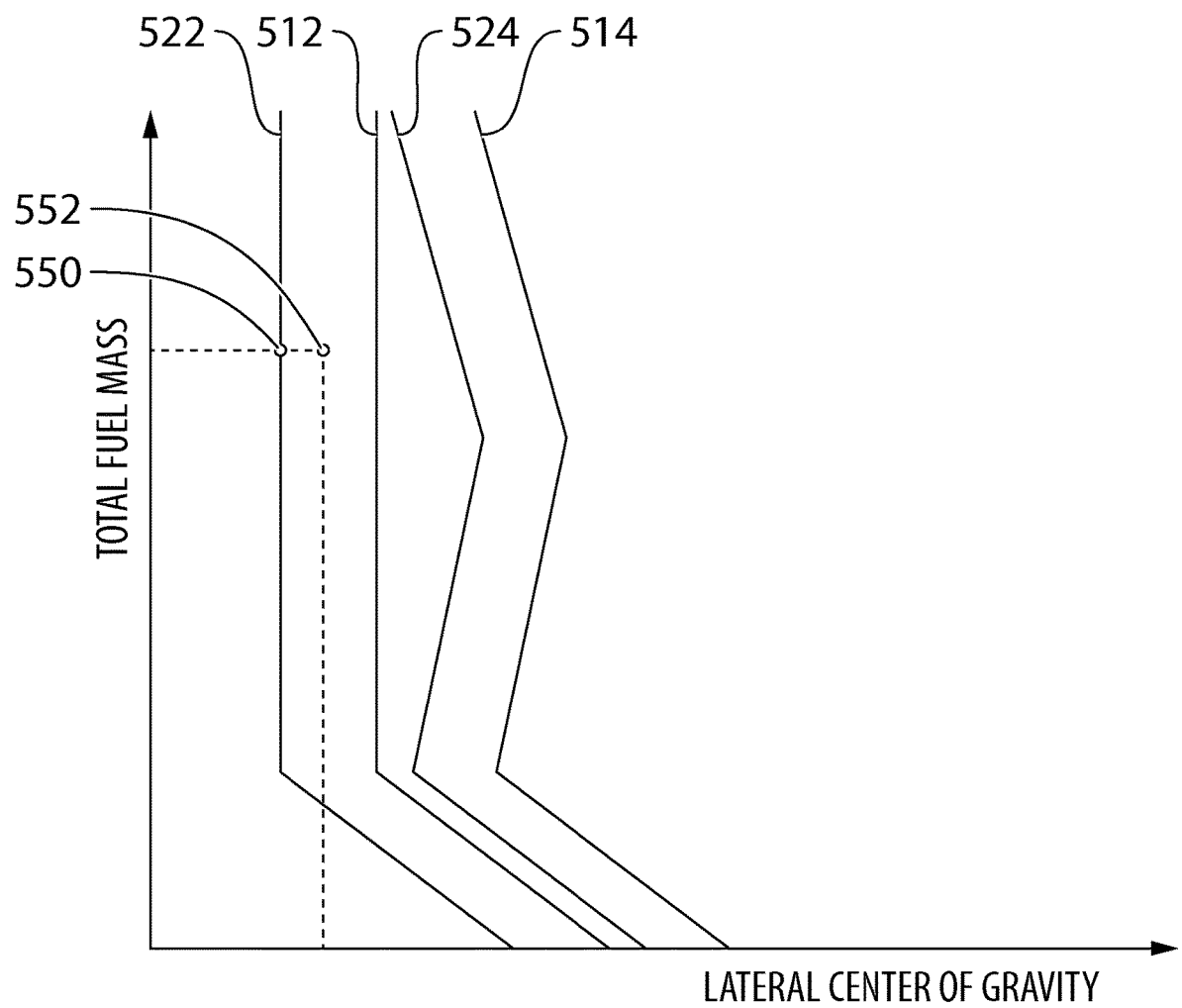
FIG. 5B is an example graphical representation of fuel rebalancing thresholds and catastrophic imbalance thresholds.

The total mass of fuel may be used to determine a value for setting a corresponding one of the threshold markers 412, 414, 422, 424. For example, a marker 550 illustrates a value from the third threshold 522 for a given total fuel mass and the value may be used to set the third threshold marker 422 of the second segment 420. FIG. 5B illustrates example thresholds 512, 514, 522, 524 for use when there is a right wing imbalance. Similar thresholds maybe be used for a left wing imbalance.

As per step 211, in some embodiments, the method 200 comprises triggering a remedial action when the lateral center of gravity exceeds at least one threshold. In some embodiments, step 211 comprises comparing the lateral center of gravity to at least one of the thresholds 512, 514, 522, 524 to determine if the lateral center of gravity exceeds at least one threshold. If so, then a remedial action may be triggered.

The remedial action may vary depending on practical implementations. For example, when the lateral center of gravity exceeds the first threshold 512 or the third threshold 522, then a rebalancing of fuel between at least some of the tanks 41, 42, 43, 44 is triggered. The aircraft 10 may comprise one or more pumps for transferring fuel between one or more of the tanks 41, 42, 43, 44. Each of the tanks 41, 42, 43, 44 may comprise one or more controllable valves used for transferring fuel to and/or from the tanks 41, 42, 43, 44 for fuel rebalancing. In another example, when the lateral center of gravity exceeds the second or fourth thresholds 522, 524, an alert is triggered. The alert may convey that the lateral center of gravity of the aircraft is at a dangerous position. The remedial action may be triggered automatically and performed by one or more control systems of the aircraft. Alternatively, the remedial action may be performed upon input from the pilot or another crew member.

In some embodiments, each of the wings 31, 32, comprises more than two tanks. For example, each of the wings 31, 32 may comprise three tanks, four tanks, five tanks or more than five tanks. In some embodiments, one or more of the tanks 41, 42, 43, 44 comprises more than one sub-compartment. Accordingly, the method 200 may be implemented in a similar manner as described herein but adapted according to the number of fuel tanks and/or sub-compartments.

Figure 6:
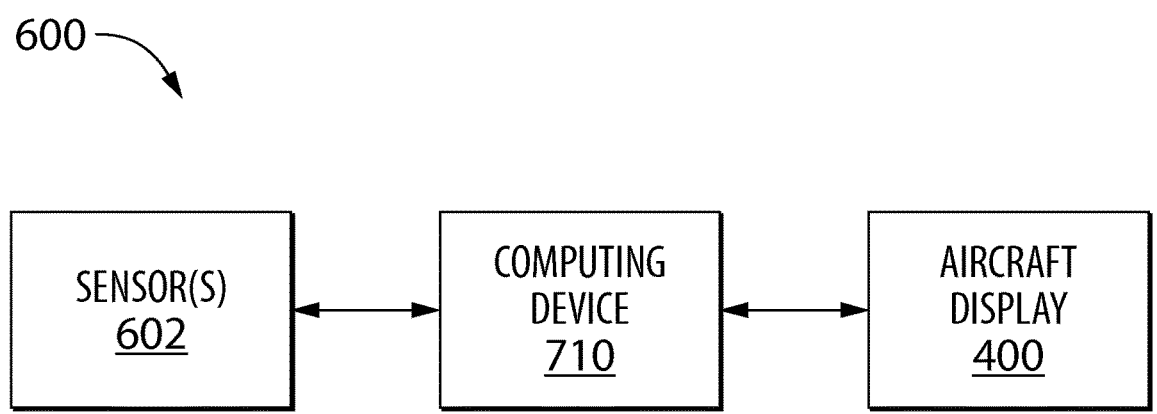
FIG. 6 is a block diagram of an example lateral center of gravity system.

With reference to FIG. 6, the method 200 may be implemented by a system 600 comprising a computing device 710. In some embodiments, the system 600 comprises one or more sensors 602 and/or an aircraft display 400. The one or more sensors 602 may comprise one or more fuel density sensor operatively coupled to computing device 710 for measuring fuel density in any given tank 41, 42, 43, 44 of the aircraft 10. The one or more sensors 602 may comprise one or more fuel volume sensors operatively coupled to computing device 710 for measuring fuel volume in any given tank 41, 42, 43, 44 of the aircraft 10. The one or more sensors 602 may comprise one or more pressure sensors operatively coupled to computing device 710 for measuring fuel pressure in any given tank 41, 42, 43, 44 of the aircraft 10. The one or more sensors 602 may comprise one or more fuel level sensors operatively coupled to computing device 710 for measuring fuel level in any given tank 41, 42, 43, 44 of the aircraft 10. The one or more sensors 602 may comprise any other suitable sensors used to measure any suitable parameters relating to the fuel in any given tank 41, 42, 43, 44 of the aircraft 10. In some embodiments, the sensors 602 are separate from the system 600 and/or may be existing parts of the aircraft 10. In some embodiments, data described herein as coming from the sensors 602 are provided by one or more other aircraft computing device or control system.

Figure 7:
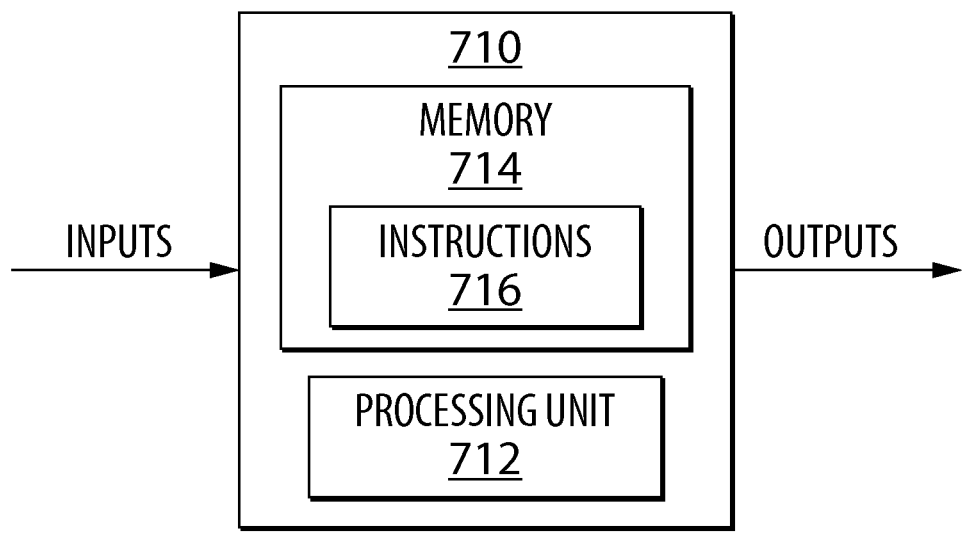
FIG. 7 is a block diagram of an example computing device.

With additional reference to FIG. 7, the computing device 710 comprises a processing unit 712 and a memory 714 which has stored therein computer-executable instructions 716. The processing unit 712 may comprise any suitable devices configured to implement the method 200 such that instructions 716, when executed by the computing device 710 or other programmable apparatus, may cause the functions/acts/steps performed as part of the method 200 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712.

The methods and systems for providing a lateral center of gravity of an aircraft described herein may be implemented in a high level procedural or object oriented programming or scripting language, or a combination thereof, to communicate with or assist in the operation of a computer system, for example the computing device 710. Alternatively, the methods and systems for providing a lateral center of gravity of an aircraft may be implemented in assembly or machine language. The language may be a compiled or interpreted language. Program code for implementing the methods and systems for providing a lateral center of gravity of an aircraft may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for providing a lateral center of gravity of an aircraft may also be considered to be implemented by way of a non-transitory computer-readable storage medium having a computer program stored thereon. The computer program may comprise computer-readable instructions which cause a computer, or more specifically the processing unit 712 of the computing device 710, to operate in a specific and predefined manner to perform the functions described herein, for example those described in the method 200. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The aircraft display 400 may comprise any kind of display such as an LCD (liquid crystal display), an LED (light emitting diode) display, a CRT (cathode ray tube) display, a HUD (Heads-up Display), a PFD (primary flight display) and/or any other suitable display device. A HUD is any transparent display that presents data in the pilot or co-pilot's field of vision without obstructing the view. A PFD is an aircraft instrument dedicated to flight information. The aircraft display 400 may display the lateral center of gravity of an aircraft as calculated by the computing device 710. Accordingly, the computing device 710 may cause a GUI (graphical user interface) to display the lateral center of gravity of the aircraft on the aircraft display 400. In some embodiments, the aircraft display 400 is separate from the system 600 and/or may be an existing part of the aircraft 10. The aircraft display 400 may be operably coupled to the computing device 710 by one or more data buses such that the computing device 710 may provide the lateral center of gravity and/or other suitable parameters to the aircraft display 400.

Computer simulation, modeling, engineering simulators and/or processing may be used to determine the various equations, look-up tables, and/or schedules described herein. By way of a specific and non-limiting example, computer simulation and modeling is used to determine an equation for each of the tanks 41, 42, 43, 44, where each equation is a function of at least one of fuel volume and fuel density and can be used to determine fuel mass and/or a corresponding center of mass. The equations, look-up tables, and/or schedules may be determined in real-time during takeoff, may be pre-determined in advance to takeoff, and/or may be determined at regular intervals.

Computer simulation, modeling, engineering simulators and/or processing may be used to determine the thresholds 512, 514, 522, 524 that vary as function of total fuel mass. Computer simulation, modeling, engineering simulators and/or processing may be used to determine the thresholds 512, 514, 522, 524 based on one or more of configurations of the tanks 41, 42, 43, 44 and a fuel burn sequence. The fuel burn sequence (also known as fuel burn scheduling) corresponds to ordering and amount in which fuel is obtained and burned from the tanks 41, 42, 43, 44 to keep the longitudinal CG within acceptable limits. The fuel burn sequence may depend on the configuration of tanks 41, 42, 43, 44. The thresholds may be determined in real-time during takeoff, may be pre-determined in advance to takeoff, and/or may be determined at regular intervals.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for providing a lateral center of gravity of an aircraft may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for providing a lateral center of gravity of an aircraft on an aircraft display, the method comprising:
    determining a fuel distribution in fuel tanks of a first wing and a second wing of the aircraft;
    determining a lateral center of gravity of the aircraft based at least in part on the fuel distribution;
    sending a signal indicative of the lateral center of gravity to the aircraft display;
    displaying the lateral center of gravity on the display with respect to at least one threshold; and
    triggering a rebalancing of fuel between at least some of a first tank, a second tank, a third tank, and a fourth tank when the lateral center of gravity exceeds a first one of the at least one threshold;
    wherein the first wing comprises the first tank that is an inboard tank, the second tank that is an outboard tank and a first pump between the first and second tanks, and the second wing comprises the third tank that is an inboard tank, the fourth tank that is an outboard tank and a second pump between the third and fourth tanks; and wherein the rebalancing of fuel is performed by at least one of the first pump and second pump.

2. The method of claim 1, wherein determining the fuel distribution comprises:
determining a first mass of fuel in the first tank from fuel density and fuel volume measurements in the first tank;
determining a second mass of fuel in the second tank from fuel density and fuel volume measurements in the second tank;
determining a third mass of fuel in the third tank from fuel density and fuel volume measurements in the third tank;
determining a fourth mass of fuel in the fourth tank from fuel density and fuel volume measurements in the fourth tank; and
determining the fuel distribution based on the first mass of fuel, the second mass of fuel, the third mass of fuel, the fourth mass of fuel and a configuration of the first tank, the second tank, the third tank and the fourth tank.

3. The method of claim 2, wherein determining the lateral center of gravity of the aircraft comprises:
determining a first moment arm based on the first mass of fuel and a first distance between a first tank center of mass and a substantially centered longitudinal axis of the aircraft;
determining a second moment arm based on the second mass of fuel and a second distance between a second tank center of mass and the substantially centered longitudinal axis of the aircraft;
determining a third moment arm based on the third mass of fuel and a third distance between a third tank center of mass and the substantially centered longitudinal axis of the aircraft;
determining a fourth moment arm based on the fourth mass of fuel and a fourth distance between a fourth tank center of mass and the substantially centered longitudinal axis of the aircraft; and
determining the lateral center of gravity using the first moment arm, the second moment arm, the third moment arm and the fourth moment arm.

4. The method of claim 1, further comprising displacing a pointer indicative of the lateral center of gravity on the display with respect to the at least one threshold when the lateral center of gravity of the aircraft changes.

5. The method of claim 1, wherein the at least one threshold comprises at least one on ground threshold for use when the aircraft is on ground and at least one inflight threshold for use when the aircraft is in flight.

6. The method of claim 1, further comprising determining the at least one threshold as a function of a total fuel mass.

7. The method of claim 1, further comprising triggering an alert when the lateral center of gravity exceeds a second one of the at least one threshold.

8. A system for providing a lateral center of gravity of an aircraft on an aircraft display, the system comprising:
a processing unit; and
a non-transitory computer-readable memory having stored thereon program instructions executable by the processing unit for:
determining a fuel distribution in fuel tanks of a first wing and a second wing of the aircraft;
determining a lateral center of gravity of the aircraft based at least in part on the fuel distribution;
sending a signal indicative of the lateral center of gravity to the aircraft display;
displaying the lateral center of gravity on the display with respect to at least one threshold; and
triggering a rebalancing of fuel between at least some of a first tank, a second tank, a third tank, and a fourth tank when the lateral center of gravity exceeds a first one of the at least one threshold;
wherein the first wing comprises the first tank that is an inboard tank, the second tank that is an outboard tank and a first pump between the first and second tanks, and the second wing comprises the third tank that is an inboard tank, the fourth tank that is an outboard tank and a second pump between the third and fourth tanks, and wherein the rebalancing of fuel is performed by at least one of the first pump and second pump.

9. The system of claim 8, wherein determining the fuel distribution comprises:
determining a first mass of fuel in the first tank from fuel density and fuel volume measurements in the first tank;
determining a second mass of fuel in the second tank from fuel density and fuel volume measurements in the second tank;
determining a third mass of fuel in the third tank from fuel density and fuel volume measurements in the third tank;
determining a fourth mass of fuel in the fourth tank from fuel density and fuel volume measurements in the fourth tank; and
determining the fuel distribution based on the first mass of fuel, the second mass of fuel, the third mass of fuel, the fourth mass of fuel and a configuration of the first tank, the second tank, the third tank and fourth tank.

10. The system of claim 9, wherein determining the lateral center of gravity of the aircraft comprises:
determining a first moment arm based on the first mass of fuel and a first distance between a first tank center of mass and a substantially centered longitudinal axis of the aircraft;
determining a second moment arm based on the second mass of fuel and a second distance between a second tank center of mass and the substantially centered longitudinal axis of the aircraft;
determining a third moment arm based on the third mass of fuel and a third distance between a third tank center of mass and the substantially centered longitudinal axis of the aircraft;
determining a fourth moment arm based on the fourth mass of fuel and a fourth distance between a fourth tank center of mass and the substantially centered longitudinal axis of the aircraft; and
determining the lateral center of gravity using the first moment arm, the second moment arm, the third moment arm and the fourth moment arm.

11. The system of claim 8, wherein the program instructions are further executable for displacing a pointer indicative of the lateral center of gravity on the display with respect to the at least one threshold when the lateral center of gravity of the aircraft changes.

12. The system of claim 8, wherein the at least one threshold comprises at least one on ground threshold for use when the aircraft is on ground and at least one inflight threshold for use when the aircraft is in flight.

13. The system of claim 8, wherein the program instructions are further executable for determining the at least one threshold as a function of a total fuel mass.

14. The system of claim 8, wherein the program instructions are further executable for triggering an alert when the lateral center of gravity exceeds a second one of the at least one threshold.

* * * * *